United States Patent [19]

Damen et al.

[11] 4,093,344
[45] June 6, 1978

[54] INFRARED POLARIZATION ROTATOR AND OPTICAL SWITCH

[75] Inventors: Theodoor Charlouis Damen, Colts Neck; Erich Gornik, Red Bank; Van-Tran Nguyen, Holmdel; Chandra Kumar Naranbhai Patel, Summit, all of N.J.

[73] Assignee: Bell Telephone Laboratories, Incorporated, Murray Hill, N.J.

[21] Appl. No.: 739,320

[22] Filed: Nov. 5, 1976

[51] Int. Cl.² .............................................. B01F 1/01
[52] U.S. Cl. ..................................... 350/147; 350/353
[58] Field of Search ........... 350/147, 154, 157, 160 R, 350/160 P

[56] References Cited

U.S. PATENT DOCUMENTS

| 3,671,747 | 6/1972 | Duguay | 350/157 |
| 4,040,718 | 8/1977 | Bjorklund et al. | 350/147 |

OTHER PUBLICATIONS

Abrams et al., "Characteristics of a Mode-Locked TEA $CO_2$ Laser", *Applied Physics Letters*, 15 Dec. 1971, pp. 518-520.

Penzkofer et al., "Two-Photon Spectroscopy Using Pico-Second Light Continua", *Applied Physics Letters*, 15, Mar. 1976, pp. 319-321.

*Primary Examiner*—John K. Corbin
*Assistant Examiner*—R. A. Rosenberger
*Attorney, Agent, or Firm*—Daniel D. Dubosky

[57] ABSTRACT

An optical polarization rotator is developed for use with infrared radiation using a nonlinear, two-photon interaction in a solid medium. The mechanism employed is resonance dispersion, where the sum frequency of an infrared beam to be rotated and a visible control beam is close to the frequency of a two-photon transition of exciton states, thereby producing different amounts of dispersion for the two orthogonal components of the linearly polarized infrared beam. The result of a phase difference between the two components is a rotation of the plane of polarization of the infrared beam.

14 Claims, 5 Drawing Figures

INFRARED POLARIZATION ROTATOR AND OPTICAL SWITCH

BACKGROUND OF THE INVENTION

This invention relates to a technique for rotating the plane of polarization of linearly-polarized optical beams in the infrared portion of the spectrum; one application of the invention is the construction of an ultrafast switch for the control of infrared beams.

The inherent nature of a pulse of radiation, as opposed to a continuous wave, is that a pulse is localized or defined in time, while a continuous wave is not so defined. This time character renders pulses suited for a wide variety of applications: basic research in nonlinear optics; the use of time resolution spectroscopy as a probe for explaining physical laws; optical communication by digital data transmission; the use of the correlation between short pulses and high peak power to generate pulses with extremely high intensity; and the use of ultrashort, ultrapowerful infrared pulses as a tool for the achievement of controlled thermonuclear fusion.

In the range of visible light, a wide variety of pulse generation devices have been developed with picosecond ($10^{-12}$sec.) pulse-width lasers being commercially available. In the infrared, on the other hand, progress in the development of ultrashort pulses has been much slower. Current research efforts produce pulses that are on the nanosecond ($10^{-9}$sec.) time scale [see Abrams, *Applied Physics Letters*, Vol. 19, No. 518 (1971)] and are limited to that range of pulse widths by the use of electrical currents as a switching mechanism.

In the visible frequency range, apparatus described in a copending application by G. C. Bjorklund et al, Ser. No. 646,425 entitled "Polarization Rotator Based on Dispersion Due to Two-Photon Transitions", filed Jan. 5, 1976, achieves ultrafast switching by means of an interaction in a gaseous medium that rotates the plane of polarization of the incident light so that it is either transmitted or blocked by a polarizing filter. This rotation of polarization is effected in the prior art by taking advantage of the fact that a linearly polarized beam consists of two circularly polarized components with opposite sense of rotation and that a change of the phase of one of the circularly polarized components by some angle will rotate the plane of polarization of the linearly polarized beam by a related angle.

The mechanism by which the phase of one circularly polarized component but not that of the other is affected is the utilization of the angular momentum selection rules of two-photon atomic transitions. Units of angular momentum are combined according to a more complex rule than are simple numbers, and some combinations are forbidden by the principle of conservation of momentum.

When the atomic transition of interest is between two states of zero angular momentum, conservation requires that, when you start out with zero and end up with zero, you must have a net change of angular momentum of zero for the transition. Since a photon carries one unit of angular momentum, a transition between two states of zero angular momentum cannot be effected by the absorption of one photon. Such a transition can be effected by the absorption of two photons if they are combined in such a way that their angular momenta cancel and they are in a state of zero angular momentum.

The above-identified copending application by Bjorklund et al is based on the foregoing principles, making use of a zero to zero transition. The beam to be rotated will not be affected by the rotation medium when it is present alone because of the angular momentum limitations discussed above. A circularly polarized control beam is provided to effect the rotation. The control beam and the component of the incident beam of opposite circular polarization can combine in a zero state that will be affected by the zero to zero transition in the conversion medium, while the component of the incident beam with the same polarization as the control beam is not able to combine to give a zero net angular momentum and is therefore unaffected. When the sum of the frequencies of the incident and control beams is close, but not equal to the frequency associated with the transition, the phase of the interacting circularly polarized component of the incident beam will be affected, according to the Kramers-Koenig relation; but that component will not be absorbed, since significant absorption takes place only when the sum frequency is equal to the transition frequency.

Since the phase of one component has been changed by some angle, the combination of the two components will not result in the same plane of polarization as the original incident beam. Effectively, one half of the strength of the original beam has been delayed by some angle $\phi$, and the result will be a linearly polarized beam with the same intensity as the original, (since there has been dispersion but not absorption), with a plane of polarization that has been rotated by half the angle $\phi$.

When the angle of rotation of the polarization plane is 90°, the addition of a polarizing filter to the apparatus will form an optical switch. If the polarizer is set at an angle of 90° from the incident plane of polarization, the incident beam will be blocked, except when the control beam's interaction rotates the incident polarization by 90°, so that it lines up with the direction of the filter and is transmitted. In this manner, the output from the apparatus is turned on and off by the control beam. The length of the output pulse is limited only by the length of the control pulse, which may be as short as a picosecond.

Although the apparatus disclosed in the above-identified copending application is a distinct improvement over the prior art in the visible range, it is not suitable for the infrared because of the limitations of the mechanism that was used in the rotation medium. The more populous levels of atomic vapors have available transitions that do not match well with the infrared. In a gaseous medium, also, the use of intermediate state resonances is limited by self-focusing and self-defocusing effects, (see copending application, Ser. No. 646,425, page 7, line 27; page 8, line 4). The avoidance of intermediate state resonance enhancement forfeits a great deal of the strength of rotation and requires the use of higher power in the control beam.

SUMMARY OF THE INVENTION

The object of our work is to rotate the polarization of an infrared beam such that it can be utilized in a switching apparatus of the type described hereinabove. We have accomplished that object by making use of a recent discovery in an entirely different area of physics from that used in the above-identified copending application by Bjorklund et al. Instead of using a feature of atomic physics, or properties of matter in the form of isolated atoms at high temperature, our invention uses a feature of solid state physics, or properties of matter in bulk at low temperatures. In accordance with the present invention, the physical mechanism used to provide polarization rotation is the dispersion provided by a narrow excited state in the exciton spectrum of a solid. In solids with valence and conduction bands, it may happen that an electron is excited from a valence band and that it forms a bound state (called an exciton) with a hole in the valence band it left. The energies of these bound states are typically slightly below that of the conduction band. These energy levels are well suited to the control of infrared radiation by visible radiation because the energy gap between the valence band and the exciton state is typically in the visible range, and the exciton states are close together in energy, with energy separations typically in the infrared. Our invention rests on the discovery of fine structure in the two-photon absorption spectrum in CdS. Heretofore, the use of excitons as a tool for polarization rotation would not have been contemplated by the prior art because it was not known that there were any excited states with suitable parameters. Indeed, the prior art taught away from this discovery, since the two-photon absorption spectrum for CdS had been studied and the fine structure had not been observed. See, for example, the article "Two-Photon Spectroscopy Using Picosecond Light Continua", by A. Penzkofer et al, *Applied Physics Letters*, Vol. 28, No. 6, p. 319 (1976).

BRIEF DESCRIPTION OF THE DRAWING

Further features and advantages of our invention will become apparent from the following detailed description taken together with the drawing wherein.

DESCRIPTION OF ILLUSTRATIVE EMBODIMENT

Figure 1:
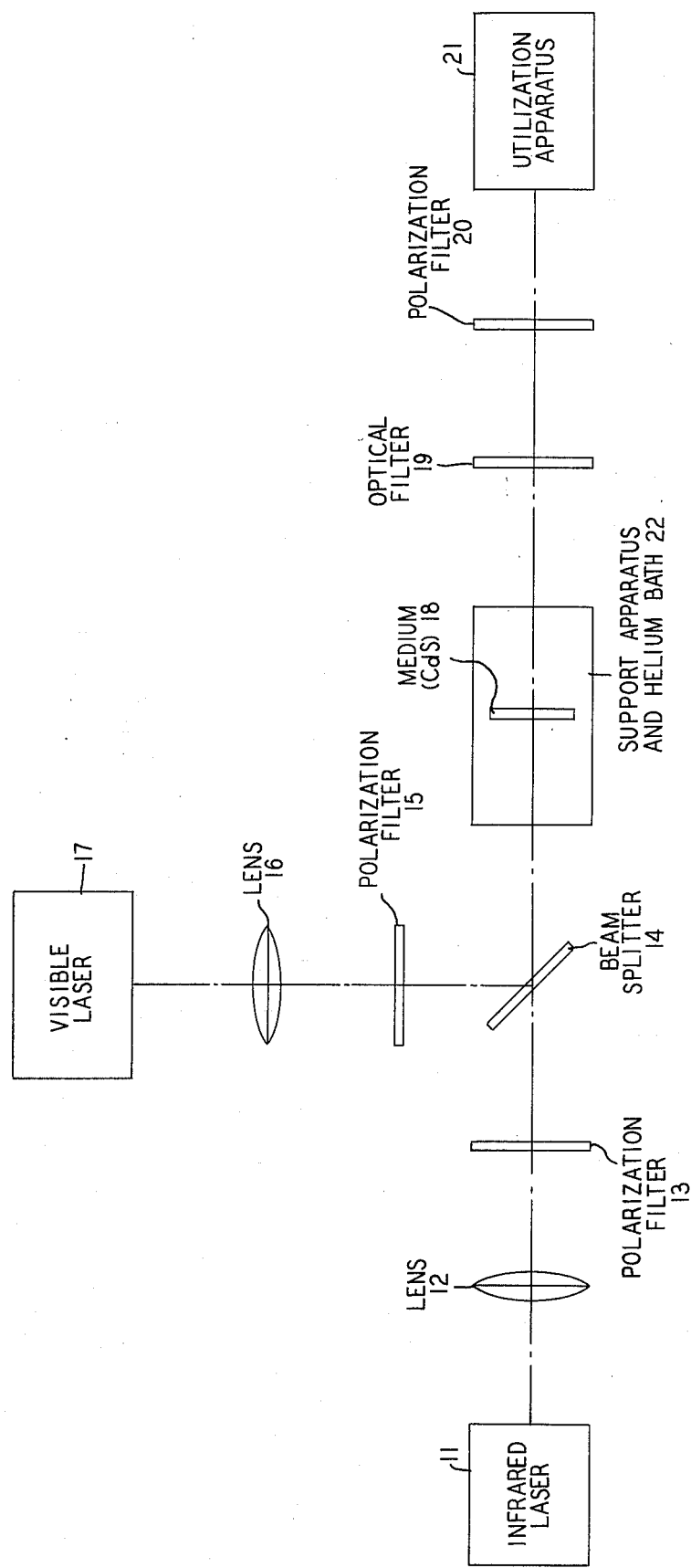
FIG. 1 shows partially in pictorial form and partially in block diagrammatic form a preferred embodiment of a polarization rotator accoding to our invention.

In the embodiment of FIG. 1, the radiation to be rotated is generated in laser 11. It is focussed onto the conversion medium 18 by the lens 12, passing through beam-splitter 14. The beam splitter 14 may be advantageously of the dichroic type. The radiation is polarized in polarization filter 13, which is positioned between lens 12 and beam splitter 14 and is adjusted as specified below. The control beam emerges from laser 17, is focused onto conversion medium 18 by lens 16, and is polarized by polarization filter 15, which is positioned between lens 16 and beam splitter 14 and is selected and adjusted as specified below. The location of the control beam is adjusted by beam splitter 14 to be substantially collinear with the signal beam. All of the above elements are of conventional type.

Conversion medium apparatus 18 comprises a 0.35 mm thick crystal of CdS, of high purity, produced by a vapor-deposition process. It is supported, positioned and maintained at a temperature of 2° K by support apparatus 22, which includes a helium bath of conventional type. The temperature of 2° K was chosen because helium is superfluid at that temperature and therefore has superior optical properties, but the particular temperature is not critical.

At the exit of the conversion medium apparatus, an optical filter 19 of conventional type removes the residue of the control beam.

A polarizing filter 20, located after optical filter 19, transmits that component of the output radiation of the conversion medium which is parallel to the axis of the filter. Modulation of the control beam will result in modulation of the plane of polarization of the output radiation from the conversion medium. The amplitude of the radiation transmitted by polarizer 20 will depend on its orientation and on the modulation of the control beam.

The radiation finally passes to utilization apparatus 21.

If polarization rotator 20 is set at 90° to the plane of polarization of the radiation emerging from polarization filter 13, and the parameters of the apparatus are adjusted to provide a rotation of 90°, then the apparatus functions as an optical switch. In the absence of a signal from control laser 17, the incident beam will be unaffected by the conversion medium and will be blocked by polarizer 20. When the control laser is turned on, the output radiation will be parallel to the axis of polarizer 20 and will be transmitted to the utilization apparatus. Among the other uses of the apparatus is as a modulator of an analog signal. Modulation of the power of the control beam will modulate the angle of rotation of the infrared beam and therefore will modulate the intensity of the infrared radiation transmitted through polarization filter 20.

The angle by which the plane of polarization will be rotated is affected by several parameters. It may be expressed as $$\phi \propto \frac{lI}{[\Omega - (\nu_v + \nu_{IR})]} \left| \sum_n \mu_{gn} \mu_{ne} \left( \frac{1}{\nu_{IR} + \nu_n} + \frac{1}{\nu_v - \nu_n} \right) \right|^2$$

where $l$ is the thickness of the crystal, $I$ is the intensity of the visible light beam, $\Omega$ is the frequency of the two-photon transition, $\nu_V$ and $\nu_{IR}$ are the frequencies of the visible and infrared beams respectively, $\nu_n$ is the frequency of the nth intermediate state, and $\mu_{gn}$ and $\mu_{ne}$ are the matrix elements that connect the nth intermediate state with the levels of the two-photon transition. The thickness of the crystal, intensity of the control beam and the closeness of the two-photon resonance, (the quantity $$\frac{1}{\Omega - (\nu_v + \nu_{IR})}$$

), all affect the angle linearly. The other factors, the closeness of approach of the visible frequency, (the quantity $$\frac{1}{\nu_v - \nu_n}$$

), and the matrix elements are more sensitive, since their squares affect the angle of rotation. Setting the visible frequency close to one of the intermediate states (referred to as intermediate state enhancement) restricts the freedom of choice of the wavelengths involved. If the other parameters provide a sufficient degree of rotation, this enhancement may be dropped. The matrix elements also affect the angle according to their squares, so the choice of a conversion medium depends largely on the magnitude of the matrix elements.

Other relevant variables for the medium are the temperature and purity. The quantity $$\frac{1}{\Omega - (\nu_v + \nu_{IR})}$$

increases when the line width of the two-photon transition of frequency $\Omega$ is narrow. This linewidth decreases in magnitude as the temperature decreases and as the amount of impurities decreases, so low temperatures and high purity are desirable.

The dependence on temperature is not sharp and a broad range of low temperatures would be adequate. In the embodiment discussed, the crystal used was produced by the vapor deposition process and was of extremely high purity. As in the case with temperature, some impurities can be tolerated, if the other parameters can be adjusted to compensate. In the current embodiment, thickness was sacrificed (at 0.35 mm, the crystal was quite thin) in order to gain in purity.

Figure 2:
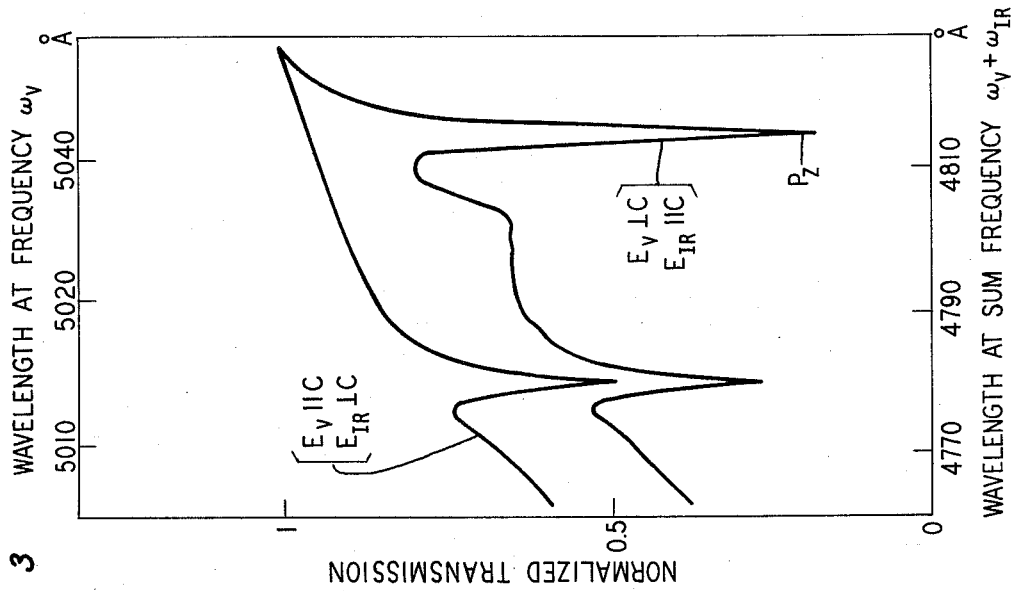
FIGS. 2 through 4 are graphs of normalized transmission through CdS as a function of the sum frequency of the two beams and of their polarization.
Figure 3:
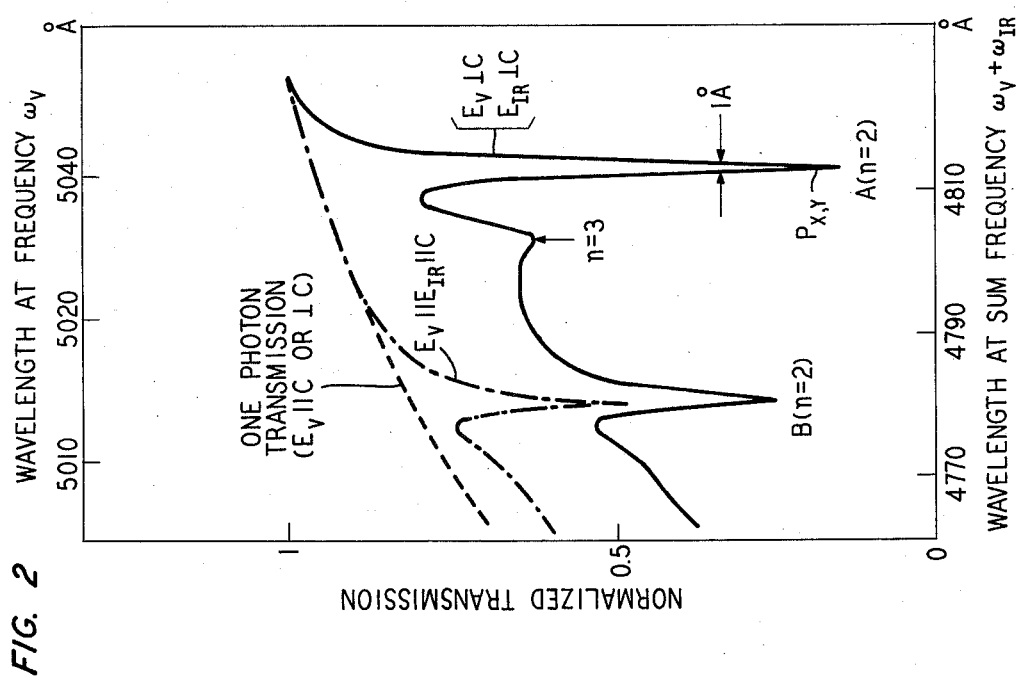

In the preferred embodiment discussed hereinabove, the conversion medium is CdS, a uniaxial, naturally birefringent crystal, with three nondegenerate valence bands, A, B, C. Only the A and B excitons (those from the A and B bands) exhibit sufficiently strong and sharp absorption to be useful. FIGS. 2 and 3 show the transmission through a CdS crystal for various combinations of control and infrared beam polarization oriented with respect to the optic axis of the crystal. The transmission minima for the B excitons are located near 4780 A and those for the A exciton are located near 4810 A, corresponding to the different energy gaps between the valence bands and the conduction band.

Figure 5:
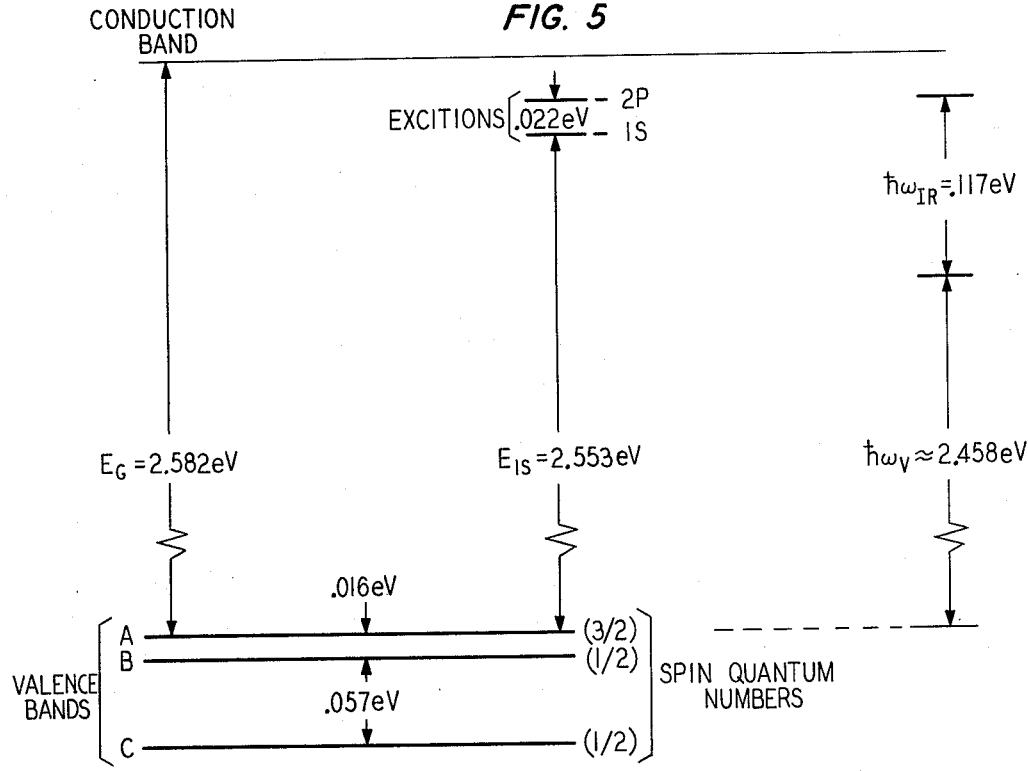
FIG. 5 is an energy level diagram useful in explaining the present invention.

FIG. 5 illustrates the energy level structure involved. The A valence band lies closer to the conduction band than does the B valence band, and therefore the A band corresponds to a longer sum wavelength. The valence bands have different spin, which is reflected in different restrictions imposed by the quantum mechanical rules referred to above. As can be seen in FIGS. 2 and 3, all combinations of polarization produce absorption for the B excitons, but the A excitons absorb only when the polarization of the visible beam is perpendicular to the optic axis. This difference in interaction results in different modes for the use of the A and B excitons, as is discussed below.

B Exciton

The B excitons have spin ½, and the quantum mechanical selection rules that apply to the dominant two-photon transition require that the angular monentum of the two-photons involved in the process combine to give a net angular momentum of zero. If the visible control beam from source 17 is circularly polarized, it may combine with only the opposite component of the linearly polarized infrared beam from source 11 in order to participate in the two-photon transition. Accordingly, when the frequencies are appropriately chosen, only one component of the infrared beam will suffer appreciable dispersion while traversing the crystal, and the outgoing beam will have its plane of polarization rotated by half the phase angle between the two circularly polarized components. Since circular polarization is involved, it is important to have azimuthal symmetry about the direction of propagation. Accordingly, the crystal is oriented with its optic axis substantially parallel to the direction of propagation of the light beams. This mechanism of quantum-mechanical selection will also work with isotropic (e.g., cubic) crystals.

A Exciton

In the case of the A exciton, advantage is taken of the asymmetry of the crystal. As a result of the birefringence of the CdS crystal, the A valence band is anisotropic. Anisotropy of a valence band can be expected in all birefringent crystals. Uniaxial crystals in general and those of the wurzite type such as CdS in particular, are expected to be suitable for this mechanism.

Figure 4:
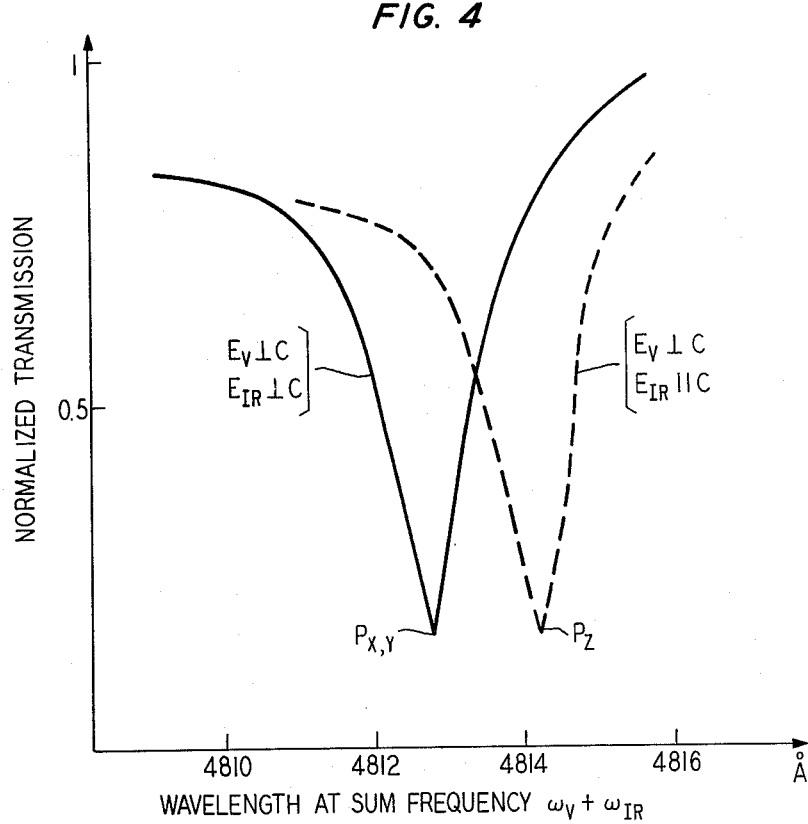

In FIGS. 2 and 3, results from a measurement of two-photon absorption in CdS are displayed. In this case, both the beams are linearly polarized, and when the polarization of the visible beam is perpendicular to the optic axis, there is pronounced absorption near 4810 A when the infrared beam polarization is either parallel or perpendicular to the optic axis. The asymmetry of the crystal is reflected in the fact that the absorption minima are at slightly different frequencies. (See FIG. 4, where the curves from FIG. 2 (labeled $P_{x,y}$) and FIG. 3 (labeled $P_z$) are replotted in a larger scale.)

If the crystal is oriented with its optic axis perpendicular to the direction of propagation of the beams, the linearly polarized visible beam is oriented with its plane of polarization perpendicular to the optic axis; and the linearly polarized infrared beam is oriented with its plane of polarization at an angle of 45° with respect to the optic axis; the conditions for both absorption minima ($P_{x,y}$ and $P_z$) may be nearly satisfied since one component of the infrared beam will be perpendicular to the optic axis and the other component will be parallel to it. The sum frequency of the beams may be adjusted in the vicinity of the two minima such that there will be much more dispersion for one component of the infrared beam than for the other, and the difference in phase between the two components will result in a new plane of polarization. This rotation may then be adjusted by varying the parameters of the apparatus to produce a desired degree of rotation.

In addition to CdS, the material in the illustrative embodiment, it is expected that other compounds formed from elements in groups II and VI of the Periodic Table of the Elements will be suitable because they will have similar structure. Particular compounds in these classes are CdSe and ZnO.

Another class of suitable materials are the "wide gap semiconductors", so called because of the magnitude of the energy gap between the valence band and the conduction band. These compounds are formed from three elements, one from each of groups I, III, and VI of the Periodic Table of the Elements. In particular, $CuGaS_2$, $CuInS_2$, $AgGaS_2$, and $AgGaSe_2$ are suitable.

In addition to the foregoing materials that are suitable for all embodiments of the invention, cubic crystals that are suitable for use in the quantum-mechanical selection mode embodiment include ZnS, CuCl, AgI, ZnSe, CdTe and ZnTe.

What is claimed is:

1. An infrared polarization rotator comprising a medium, means for applying to said medium a linearly polarized beam of light to be polarization rotated, means for applying to said medium substantially collinearly with said beam a control beam of circularly polarized light, the frequencies of the beams being adjusted so that the frequency of one beam is nearly equal to the frequency of a one-photon transition between the ground state of a two-photon transition of the medium and some intermediate state and so that the sum of the frequencies of the two beams is sufficiently close to the frequency of said two-photon transition for substantial resonance dispersion to be produced as the beams traverse the medium, the polarization of the beams being selected in accordance with the requirements of the quantum-mechanical angular momentum selection rule which applies to said two-photon transition, characterized in that said medium is a crystalline solid the index of refraction of which does not substantially vary azimuthally about the direction of propagation of the radiation to be polarization rotated, said crystal having a structure of excited states of excitons, which exciton states are involved in said one-photon and two-photon transitions.

2. A polarization rotator according to claim 1 in which the medium is an uniaxial crystal.

3. A polarization rotator according to claim 1 in which the medium is a crystal of the wurzite type.

4. A polarization rotator according to claim 1 in which the medium is CdS.

5. A polarization rotator according to claim 1 in which the medium is a cubic crystal.

6. A polarization rotator according to claim 1 in which the medium is a compound selected from the group consisting of ZnS, CuCl, AgI, ZnSe, CdTe, and ZnTe.

7. An infrared polarization rotator comprising a medium, means for applying to said medium a beam of linearly polarized infrared radiation to be polarization rotated, means for applying to said medium substantially collinearly with said beam a control beam of linearly polarized light, the frequencies of the beams being adjusted so that the frequency of one beam is nearly equal to the frequency of a one-photon transition between the ground state of a two-photon transition of the medium and some intermediate state and so that the sum of the frequencies of the two beams is sufficiently close to the frequency of said two-photon transition for substantial resonance dispersion to be produced as the beams traverse the medium, characterized in that said medium is a birefringent solid crystal having a structure of excited states of excitons, which exciton states are involved in said one-photon and two-photon transitions, said crystal being oriented with its optic axis perpendicular to the direction of travel of said beams, said linearly polarized control beam of light being oriented so that its plane of polarization is substantially perpendicular to the optic axis, said beam of linearly polarized infrared radiation being oriented so that its plane of polarization is neither parallel nor perpendicular to the optic axis.

8. A polarization rotator according to claim 7 in which the medium is a crystal of the wurzite type.

9. A polarization rotator according to claim 7 in which the medium is CdS.

10. A polarization rotator according to claim 7 in which the medium is crystal composed of two elements, one from group two of the periodic table of the elements and one from group six.

11. A polarization rotator according to claim 7 in which the medium is a crystal composed of three elements, one from group one of the periodic table of the elements, one from group three and one from group six.

12. A polarization rotator according to claim 7 in which the medium is a crystal selected from the class of compounds consisting of CdSe and ZnO.

13. A polarization rotator according to claim 7 in which the medium is a crystal selected from the class of compounds consisting of $CuGaS_2$, $CuInS_2$, and $AgGaSe_2$.

14. A polarization rotator according to claim 7 in which the medium is a uniaxial crystal.

* * * * *